(12) United States Patent
Tretbar et al.

(10) Patent No.: US 12,344,717 B2
(45) Date of Patent: Jul. 1, 2025

(54) GENERAL STRATEGY FOR POLYMER COMPATIBILIZATION

(71) Applicant: The Regents of the University of California, Oakland, CA (US)

(72) Inventors: Chase Tretbar, Irvine, CA (US); Zhibin Guan, Irvine, CA (US)

(73) Assignee: The Regents of the University of California, Oakland, CA (US)

( * ) Notice: Subject to any disclaimer, the term of this patent is extended or adjusted under 35 U.S.C. 154(b) by 137 days.

(21) Appl. No.: 17/857,842

(22) Filed: Jul. 5, 2022

(65) Prior Publication Data

US 2023/0039491 A1 Feb. 9, 2023

Related U.S. Application Data

(60) Provisional application No. 63/218,235, filed on Jul. 2, 2021.

(51) Int. Cl.
| | |
|---|---|
| *C08L 23/06* | (2006.01) |
| *C08F 110/02* | (2006.01) |
| *C08F 110/06* | (2006.01) |
| *C08F 120/14* | (2006.01) |
| *C08J 3/24* | (2006.01) |

(52) U.S. Cl.
CPC ............... *C08J 3/24* (2013.01); *C08F 110/02* (2013.01); *C08F 110/06* (2013.01); *C08F 120/14* (2013.01); *C08L 23/06* (2013.01); *C08J 2323/06* (2013.01); *C08J 2323/12* (2013.01); *C08J 2333/12* (2013.01); *C08L 2205/08* (2013.01); *C08L 2207/062* (2013.01); *C08L 2312/02* (2013.01)

(58) Field of Classification Search
CPC ...... C08J 3/24; C08J 2323/06; C08J 2323/12; C08J 2333/12; C08F 110/02; C08F 255/02; C08F 8/42; C08F 110/06; C08F 120/14; C08L 2207/062; C08L 2312/02; C08L 2205/08; C08L 23/06
See application file for complete search history.

(56) References Cited

U.S. PATENT DOCUMENTS

| | | | |
|---|---|---|---|
| 4,182,398 A | 1/1980 | Salyer et al. | |
| 2009/0126932 A1* | 5/2009 | Robinson | C08F 220/281 548/431 |
| 2014/0348772 A1* | 11/2014 | Goepferich | A61K 47/34 424/93.1 |

FOREIGN PATENT DOCUMENTS

| | | | |
|---|---|---|---|
| CN | 110790958 | * | 2/2020 |
| CN | 111454384 | * | 7/2020 |

OTHER PUBLICATIONS

Magana, Reactive & Functional Polymers 70 (2010) 442-448 (Year: 2010).*
Translation of CN 110790958 (Year: 2020).*
Translation of CN 111454384 (Year: 2020).*
(Continued)

*Primary Examiner* — Robert C Boyle
(74) *Attorney, Agent, or Firm* — Brooks Kushman P.C.

(57) ABSTRACT

A polymer composition that operates as a polymer compatibilizer is provided. The polymer composition includes a plurality of polymer backbones cross-linked by cross-links that are Diels-Alder reaction products of at least one dienophile-containing moiety and at least one diene-containing moiety.

18 Claims, 6 Drawing Sheets

(56) References Cited

OTHER PUBLICATIONS

Barlow, J. W.; Paul, D. R. Polymer Blends and Alloys-a Review of Selected Considerations. Polym. Eng. Sci. 1981, 21 (15), 985-996. https://doi.org/10.1002/pen.760211502.

Luciani, A.; Jarrin, J. Morphology Development in Immiscible Polymer Blends. Polym. Eng. Sci. 1996, 36 (12), 1619-1626. https://doi.org/10.1002/pen.10558.

Porter, R. S.; Johnson, J. F. The Entanglement Concept in Polymer Systems. Chem. Rev. 1966, 66 (1), 1-27. https://doi.org/10.1021/cr60239a001.

Kinloch, A. J. Fracture Behaviour of Polymers; Springer Science & Business Media, 2013.

Eagan, J. M.; Xu, J.; Girolamo, R. D.; Thurber, C. M.; Macosko, C. W.; LaPointe, A. M.; Bates, F. S.; Coates, G. W. Combining Polyethylene and Polypropylene: Enhanced Performance with PE/IPP Multiblock Polymers. Science 2017, 355 (6327), 814-816. https://doi.org/10.1126/science.aah5744.

Xu, Y.; Thurber, C. M.; Macosko, C. W.; Lodge, T. P.; Hillmyer, M. A. Poly(Methyl Methacrylate)-Block-Polyethylene-Block-Poly(Methyl Methacrylate) Triblock Copolymers as Compatibilizers for Polyethylene/Poly(Methyl Methacrylate) Blends. Ind. Eng. Chem. Res. 2014, 53 (12), 4718-4725. https://doi.org/10.1021/ie4043196.

Rigby, D.; Lin, J. L.; Roe, R. J. Compatibilizing Effect of Random or Block Copolymer Added to Binary Mixture of Homopolymers. Macromolecules 1985, 18 (11), 2269-2273. https://doi.org/10.1021/ma00153a036.

Blom, H. P.; Teh, J. W.; Rudin, A. I-PP/HDPE Blends. III. Characterization and Compatibilization at Lower i-PP Contents. J. Appl. Polym. Sci. 1996, 61 (6), 959-968. https://doi.org/10.1002/(SICI)1097-4628(19960808)61:6<959::AID-APP10>3.0.CO;2-Q.

Sun, Y.-J.; Hu, G.-H.; Lambla, M.; Kotlar, H. K. In Situ Compatibilization of Polypropylene and Poly(Butylene Terephthalate) Polymer Blends by One-Step Reactive Extrusion. Polymer 1996, 37 (18), 4119-4127. https://doi.org/10.1016/0032-3861(96)00229-7.

Wei, B.; Lin, Q.; Zheng, X.; Gu, X.; Zhao, L.; Li, J.; Li, Y. Reactive Splicing Compatibilization of Immiscible Polymer Blends: Compatibilizer Synthesis in the Melt State and Compatibilizer Architecture Effects. Polymer 2019, 185, 121952. https://doi.org/10.1016/j.polymer.2019.121952.

Jannasch, P.; Wesslen, B. Poly(Styrene-Graft-Ethylene Oxide) as a Compatibilizer in Polystyrene/Polyamide Blends. J. Appl. Polym. Sci. 1995, 58 (4), 753-770. https://doi.org/10.1002/app.1995.070580408.

Xu, Y.; Thurber, C. M.; Lodge, T. P.; Hillmyer, M. A. Synthesis and Remarkable Efficacy of Model Polyethylene-Graft-Poly(Methyl Methacrylate) Copolymers as Compatibilizers in Polyethylene/Poly(Methyl Methacrylate) Blends. Macromolecules 2012, 45 (24), 9604-9610. https://doi.org/10.1021/ma302187b.

Brieger, G.; Bennett, J. N. The Intramolecular Diels-Alder Reaction. Chem. Rev. 1980, 80 (1), 63-97. https://doi.org/10.1021/cr60323a004.

Gandini, A. The Furan/Maleimide Diels-Alder Reaction: A Versatile Click-Unclick Tool in Macromolecular Synthesis. Prog. Polym. Sci. 2013, 38 (1), 1-29. https://doi.org/10.1016/j.progpolymsci.2012.04.002.

Aubin, M.; Prud'homme, R. E. Analysis of the Glass Transition Temperature of Miscible Polymer Blends. Macromolecules 1988, 21 (10), 2945-2949. https://doi.org/10.1021/ma00188a010.

Geyer, R.; Jambeck, J. R.; Law, K. L. Production, Use, and Fate of All Plastics Ever Made. Sci. Adv. 2017, 3 (7), e1700782. https://doi.org/10.1126/sciadv.1700782.

A.; Joullie, M.; Spanevello, R.; Suarez, A. Microwave-Assisted Regioselective Cycloaddition Reactions between 9-Substituted Anthracenes and Levoglucosenone. Org. Lett. 2006, 8, 24, 5561-5564. https://doi.org/10.1021/ol062254g.

Reddy, P.; Kondo, S.; Toru, T.; Ueno, Y. Lewis Acid and Hexamethyldisilazane-Promoted Efficient Synthesis of N-Alkyl- and N-Arylimide Derivatives. J. Org. Chem. 1997. 62(8), 2652-2654. https://doi.org/10.1021/jo962202c.

Shieh et al., Silane Grafting Reactions of LDPE, HDPE, and LLDPE, Journal of Applied Polymer Science, vol. 74, 1999, 8 pages.

Non-Final Office Action dated Apr. 3, 2025 for U.S. Appl. No. 17/857,554, filed Jul. 5, 2022.

\* cited by examiner

Scheme 2. Synthesis of substituted anthracenes and maleimides.

GENERAL STRATEGY FOR POLYMER COMPATIBILIZATION

CROSS-REFERENCE TO RELATED APPLICATIONS

This application claims the benefit of U.S. provisional application Ser. No. 63/218,235 filed Jul. 2, 2021, the disclosure of which is hereby incorporated in its entirety by reference herein.

STATEMENT REGARDING FEDERALLY SPONSORED RESEARCH OR DEVELOPMENT

The invention was made with Government support under Contract No. DMR-1810217 awarded by the National Science Foundation (NSF). The Government has certain rights to the invention.

TECHNICAL FIELD

In at least one aspect, the present invention is related to polymer compatibilizers formed by a Diels-Alder reaction.

BACKGROUND

Despite the seemingly limitless combination of polymers relatively few are miscible.[1,2] Most polymer blends have a positive free energy of mixing ($\Delta G_m > 0$) since $\Delta G_m$ is largely determined by the enthalpic contribution of mixing high molecular weight polymers. Macromolecules have a low entropy of mixing, therefore the entropic contribution to $\Delta G_m$ is low.[3] The blending of immiscible polymers results in a phase segregated material with poor physical properties, coarse morphology, and weak adhesion between domains.[4] Since polymers derive their strength from chain entanglement, a discontinuity of entanglement at the phase-separated interface dramatically weakens polymer blends.[5,6] To improve performance, the interface between domains can be strengthened by the addition of a compatibilizer.[1]

Compatibilizers work to reduce interfacial tension and act as emulsifiers between the phases. When compatibilizers are added, the mechanical strength is dramatically increased due to the formation of covalent bonds across the interface.[1] Compatibilizers can be grouped into two major categories that work through: i) addition of a pre-made compatibilizer such as block copolymers,[7,8] random copolymers,[9,10] and mutually miscible homopolymers,[1] and ii) reactive compatibilization which generates linkages between immiscible polymers in situ such as the direct reactive compatibilization of homopolymers[11,12] and preparation of graft-from homopolymers.[13,14] Neither method of compatibilization is a general solution and each method remains limited in application scope. In the case of pre-made compatibilizers, the compatibilizer structure needs to be tailored for the individually immiscible polymers, and in the case of reactive compatibilization, the immiscible polymers must have complementary reactive motifs. Due to the expansive variety of polymer backbones, a generalized compatibilizer has not been developed to date. Such a development would be of great importance for combining unknown types and compositions of immiscible blends.

SUMMARY

In at least one aspect, a polymer composition that operates as a polymer compatibilizer is provided. The polymer composition includes a plurality of polymer backbones cross-linked by cross-links that are Diels-Alder reaction products of at least one dienophile-containing moiety and at least one diene-containing moiety.

In another aspect, the plurality of polymer backbones cross-linked by cross-links includes a first cyclohexene moiety and a second cyclohexene moiety separated by a predetermined number of carbon atoms or heteroatoms.

In another aspect, the at least one dienophile-containing moiety and the at least one diene-containing moiety are grafted onto the same polymer backbone such that cross-linking occurs between two or more polymer backbones or within a single polymer backbone.

In another aspect, the at least one dienophile-containing moiety is grafted onto a first subset of the plurality of polymer backbones and the at least one diene-containing moiety is grafted onto a second subset of the plurality of polymer backbones such that cross-linking occurs between two or more polymer backbones.

In another aspect, the at least one diene-containing moiety is grafted onto polymer backbones and cross-linking agents that carry two or more dienophile-containing moieties such that cross-linking occurs between two or more polymer backbones.

In another aspect, wherein the at least one dienophile-containing moiety is grafted onto polymer backbones and cross-linking agents that carry two or more diene-containing moieties such that cross-linking occurs between two or more polymer backbones.

In another aspect, the plurality of polymer backbones is provided from a plurality of polymer compositions with differing chemical formulations, each polymer composition with differing chemical formulations including a portion of the plurality of polymer backbones.

In another aspect, a method for making a polymer composition that operates as a polymer compatibilizer is provided. The method includes steps of providing a plurality of polymer backbones and cross-linking the plurality of polymer backbones by a Diels-Alder reaction between at least one dienophile-containing moiety and at least one diene-containing moiety at a reaction temperature.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

For a further understanding of the nature, objects, and advantages of the present disclosure, reference should be made to the following detailed description, read in conjunction with the following drawings, wherein like reference numerals denote like elements and wherein.

BMI-1500 (middle left) 50% iPP+40% HDPE+10% PP-g-furmn+1 equiv. BMI-358 (middle center) 50% iPP+40% HDPE+10% PP-g-furan+1 equiv. BMI-1500 (middle right) 50% iPP+50% polystyrene (lower left) 50% iPP+40% polystyrene+10% PP-g-furan+1 equiv. BMI-1500 (lower center) 50% iPP+50% polyvinyl chloride (lower right) 50% iPP+40% polyvinyl chloride+10% PP-g-furan+1 equiv. BMI-1500.

Figure 4:
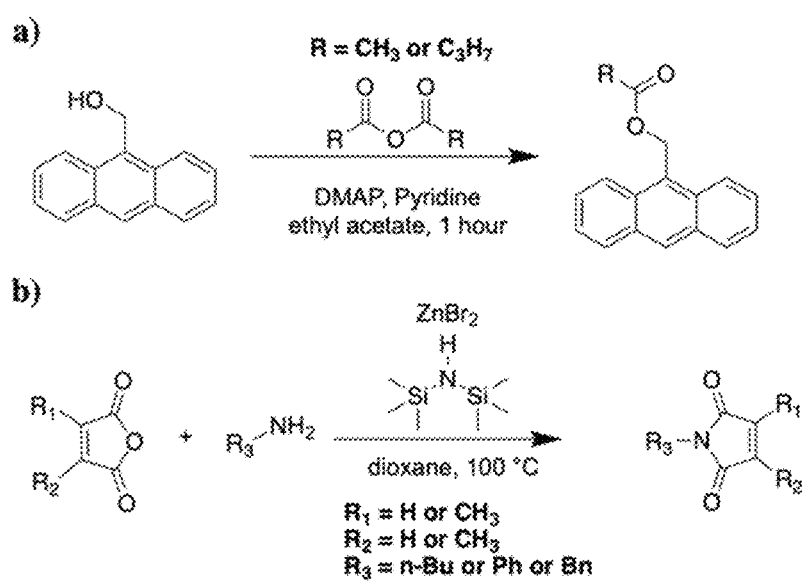

FIG. 4. Scheme 2. Synthesis of substituted anthracenes and maleimides.

Figure 5A:
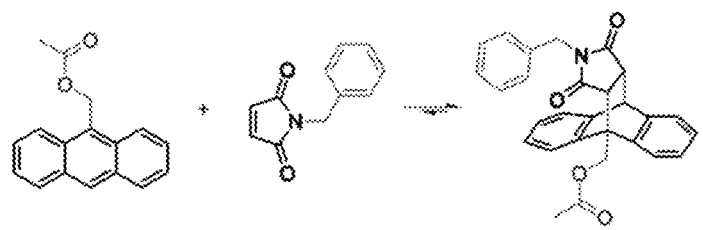
Figure 5B:
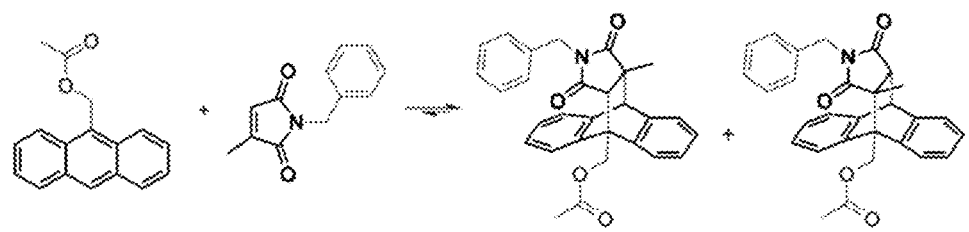
Figure 5C:
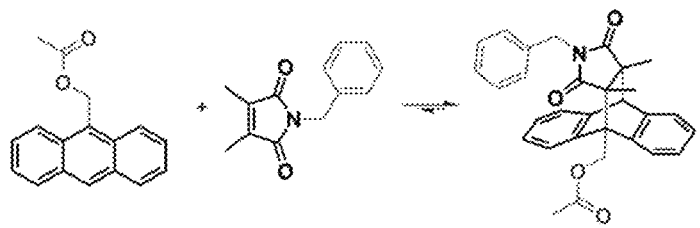

FIGS. 5A, 5B, and 5C. FIG. 5.3. Model reactions of substituted anthracene and maleimides (A) Equilibrium between acetylated anthracene and unsubstituted maleimide. (B) Equilibrium between acetylated anthracene and mono-substituted maleimide. Two isomers are available for the product resulting from the asymmetric adduct formation. (C) Equilibrium between acetylated anthracene and the disubstituted maleimide.

Figure 6A:
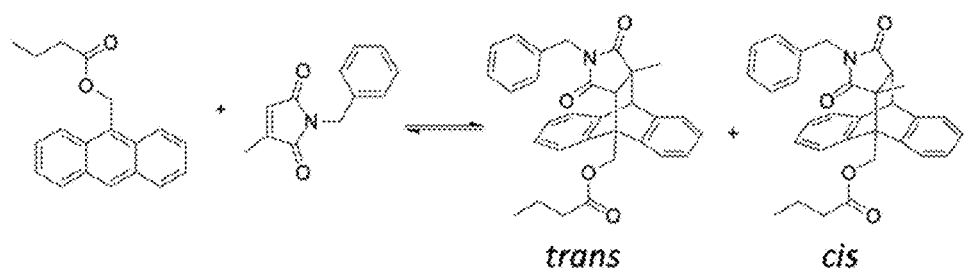
Figure 6B:
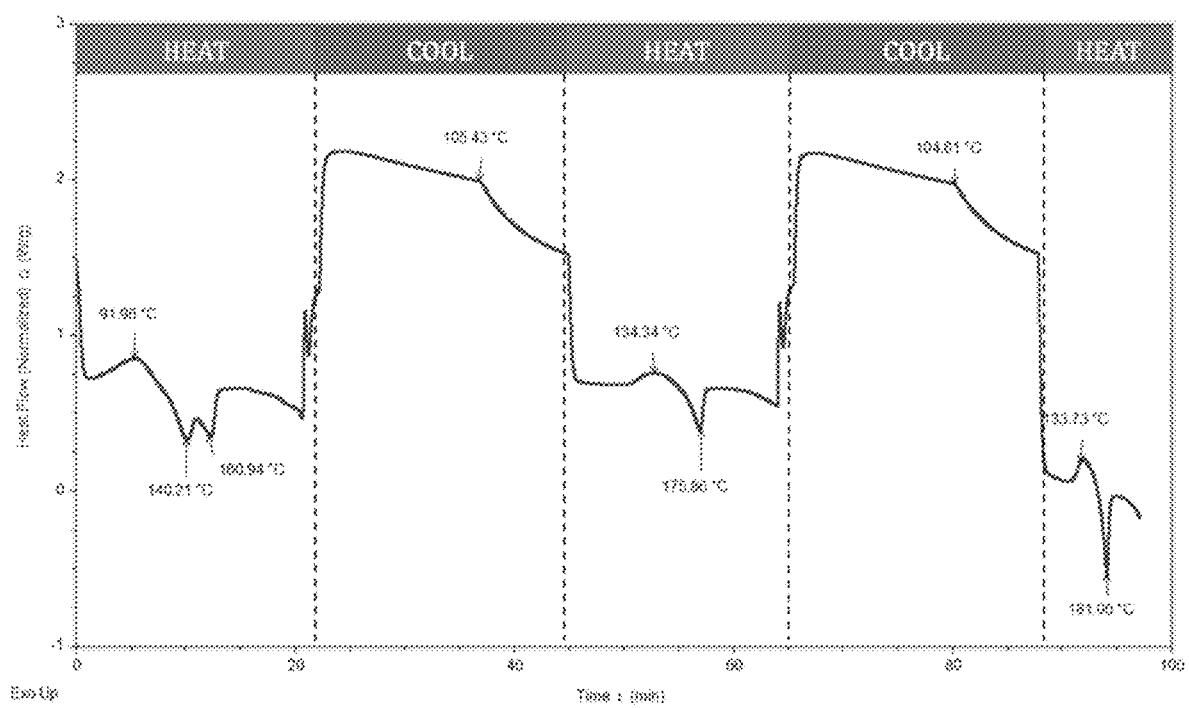

FIGS. 6A and 6B. DSC thermogram of the anthracene-monomethylmaleimide DA equilibrium. (A) Equilibrium between the butyric anthracene and monomethylmaleimide. With rapid cooling, both cis and trans conformations can be detected. (B) DSC heat-cool thermograms indicating adduct formation and reversion at different temperatures.

DETAILED DESCRIPTION

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: all R groups (e.g. $R_i$ where i is an integer) include hydrogen, alkyl, lower alkyl, $C_{1-6}$ alkyl, $C_{6-10}$ aryl, $C_{6-10}$ heteroaryl, alylaryl (e.g., $C_{1-8}$ alkyl $C_{6-10}$ aryl), —$NO_2$, —$NH_2$, —N(R'R''), —N(R'R''R''')$^+$L$^-$, Cl, F, Br, —$CF_3$, —$CCl_3$, —CN, —$SO_3$H, —$PO_3H_2$, —COOH, —$CO_2$R', —COR', —CHO, —OH, —OR', —O$^-$M$^+$, —$SO_3^-$M$^+$, —$PO_3^-$M$^+$, —COO$^-$M$^+$, —$CF_2$H, —$CF_2$R', —$CFH_2$, and —CFR'R'' where R', R'' and R''' are $C_{1-10}$ alkyl or $C_{6-18}$ aryl groups, M$^+$ is a metal ion, and L$^-$ is a negatively charged counter ion; R groups on adjacent carbon atoms can be combined as —$OCH_2O$—; single letters (e.g., "n" or "o") are 1, 2, 3, 4, or 5; in the compounds disclosed herein a CH bond can be substituted with alkyl, lower alkyl, $C_{1-6}$ alkyl, $C_{6-10}$ aryl, $C_{6-10}$ heteroaryl, —$NO_2$, —$NH_2$, —N(R'R''), —N(R'R''R''')$^+$L$^-$, Cl, F, Br, —$CF_3$, —$CCl_3$, —CN, —$SO_3$H, —$PO_3H_2$, —COOH, —$CO_2$R', —COR', —CHO, —OH, —OR', —O$^-$M$^+$, —$SO_3^-$M$^+$, —$PO_3^-$M$^+$, —COO$^-$M$^+$, —$CF_2$H, —$CF_2$R', —$CFH_2$, and —CFR'R'' where R', R'' and R''' are $C_{1-10}$ alkyl or $C_{6-18}$ aryl groups, M$^+$ is a metal ion, and L$^-$ is a negatively charged counter ion; hydrogen atoms on adjacent carbon atoms can be substituted as —$OCH_2O$—; when a given chemical structure includes a substituent on a chemical moiety (e.g., on an aryl, alkyl, etc.) that substituent is imputed to a more general chemical structure encompassing the given structure; percent, "parts of," and ratio values are by weight; the term "polymer" includes "oligomer," "copolymer," "terpolymer," and the like; molecular weights provided for any polymers refers to weight average molecular weight unless otherwise indicated; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It must also be noted that, as used in the specification and the appended claims, the singular form "a," "an," and "the" comprise plural referents unless the context clearly indicates otherwise. For example, reference to a component in the singular is intended to comprise a plurality of components.

As used herein, the term "about" means that the amount or value in question may be the specific value designated or some other value in its neighborhood. Generally, the term "about" denoting a certain value is intended to denote a range within +/−5% of the value. As one example, the phrase "about 100" denotes a range of 100+/−5, i.e. the range from 95 to 105. Generally, when the term "about" is used, it can be expected that similar results or effects according to the invention can be obtained within a range of +/−5% of the indicated value.

As used herein, the term "and/or" means that either all or only one of the elements of said group may be present. For example, "A and/or B" shall mean "only A, or only B, or both A and B". In the case of "only A", the term also covers the possibility that B is absent, i.e. "only A, but not B".

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

The phrase "composed of" means "including" or "consisting of." Typically, this phrase is used to denote that an object is formed from a material.

With respect to the terms "comprising," "consisting of," and "consisting essentially of," where one of these three terms is used herein, the presently disclosed and claimed subject matter can include the use of either of the other two terms.

The term "one or more" means "at least one" and the term "at least one" means "one or more." The terms "one or more" and "at least one" include "plurality" and "multiple" as a subset. In a refinement, "one or more" includes "two or more."

The term "substantially," "generally," or "about" may be used herein to describe disclosed or claimed embodiments. The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

It should also be appreciated that integer ranges explicitly include all intervening integers. For example, the integer range 1-10 explicitly includes 1, 2, 3, 4, 5, 6, 7, 8, 9, and 10. Similarly, the range 1 to 100 includes 1, 2, 3, 4 . . . 0.97, 98, 99, 100. Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits.

When referring to a numeral quantity, in a refinement, the term "less than" includes a lower non-included limit that is 5 percent of the number indicated after "less than." For example, "less than 20" includes a lower non-included limit of 1 in a refinement. Therefore, this refinement of "less than 20" includes a range between 1 and 20. In another refinement, the term "less than" includes a lower non-included limit that is, in increasing order of preference, 20 percent, 10 percent, 5 percent, or 1 percent of the number indicated after "less than."

In the examples set forth herein, concentrations, temperature, and reaction conditions (e.g., pressure, pH, flow rates, etc.) can be practiced with plus or minus 50 percent of the values indicated rounded to or truncated to two significant figures of the value provided in the examples. In a refinement, concentrations, temperature, and reaction conditions (e.g., pressure, pH, flow rates, etc.) can be practiced with plus or minus 30 percent of the values indicated rounded to or truncated to two significant figures of the value provided in the examples. In another refinement, concentrations, temperature, and reaction conditions (e.g., pressure, pH, flow rates, etc.) can be practiced with plus or minus 10 percent of the values indicated rounded to or truncated to two significant figures of the value provided in the examples.

For all compounds expressed as an empirical chemical formula with a plurality of letters and numeric subscripts (e.g., $CH_2O$), values of the subscripts can be plus or minus 50 percent of the values indicated rounded to or truncated to two significant figures. For example, if $CH_2O$ is indicated, a compound of formula $C_{(0.8-1.2)}H_{(1.6-2.4)}O_{(0.8-1.2)}$. In a refinement, values of the subscripts can be plus or minus 30 percent of the values indicated rounded to or truncated to two significant figures. In still another refinement, values of the subscripts can be plus or minus 20 percent of the values indicated rounded to or truncated to two significant figures.

The term "Diels-Alder reaction" refers to the pericyclic reaction between a diene and a dienophile that forms a cyclohexene.

The term "dienophile" means an olefinic or acetylenic component that reacts with a diene in the Diels-Alder reaction.

The term "diene" as used herein means a conjugated diene that reacts with the dienophile in the Diels-Alder reaction.

Throughout this application, where publications are referenced, the disclosures of these publications in their entireties are hereby incorporated by reference into this application to more fully describe the state of the art to which this invention pertains.

Abbreviations

"DA" means Diels-Alder.

In an embodiment, a polymer composition that operates as a polymer compatibilizer is provided. The polymer composition includes a plurality of polymer backbones cross-linked by cross-links that are Diels-Alder reaction products of a dienophile-containing moiety and a diene-containing moiety. In this regard, each cross-link includes a first cyclohexene moiety and a second cyclohexene moiety separated by a predetermined number of carbon atoms or heteroatoms.

In a variation, the cyclohexene units from the Diels-Alder cross-linking reaction are present in an amount from at least $1 \times 10^{-6}$ to about $1 \times 10^{-3}$ mol/g of the total weight of the polymer blends. In a refinement, cyclohexene units from the Diels-Alder cross-linking reaction are present in an amount from at least $1 \times 10^{-5}$ to about $1 \times 10^{-4}$ mol/g of the total weight of the polymer blends.

In one variation, at least one dienophile-containing moiety and at least one diene-containing moiety are grafted onto the same polymer backbone. In this variation, the cross-linking can occur between two or more polymer backbones or within a single polymer backbone.

In another variation, at least one dienophile-containing moiety is grafted onto a first subset of the plurality of polymer backbones and at least one diene-containing moiety is grafted onto a second subset of the plurality of polymer backbones. In this variation, cross-linking can occur between two or more polymer backbones.

In another variation, at least one diene-containing moiety is grafted onto polymer backbones and cross-linking agents that carry two or more dienophile-containing moieties. In this variation, cross-linking can occur between two or more polymer backbones.

In still another variation, at least one dienophile-containing moiety is grafted onto polymer backbones and cross-linking agents that carry two or more diene-containing moieties. In this variation, cross-linking can occur between two or more polymer backbones.

In another variation, the plurality of polymer backbones is provided from a plurality of polymer compositions with differing chemical formulations with each polymer composition including a portion of the plurality of polymer backbones.

In some variations, the diene group-containing moiety includes a conjugated diene having the following formula:

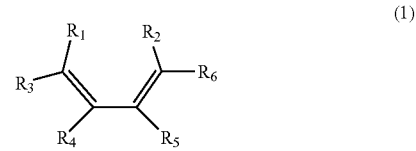

wherein $R_1$, $R_2$ are each independently H, $C_{1-10}$ alkyl, $CO_2R_7$, $COR_7$, or CN, or $R_1$ and $R_2$ are merged together to form a 5, 6, or 7 member hydrocarbon ring optionally substituted with a hetero atom (e.g., NR, O, S where R is H or $C_{1-6}$ alkyl) and/or =O;

$R_3$, $R_4$, $R_5$, $R_6$ are each independently H, $C_{1-10}$ alkyl, $CO_2R_7$, $COR_7$, or CN with the proviso that at least one of $R_1$, $R_2$, $R_3$, $R_4$, $R_5$, $R_6$ is attached to a polymer backbone or a cross-linking agent; and R7 is H or C1-6 alkyl.

Examples of diene group-containing moieties include, but are not limited to, a conjugated diene-containing moiety selected from the group consisting of substituted or unsubstituted conjugated dienes having formulae 2 to 10:

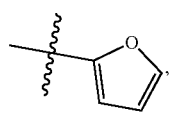
(2)

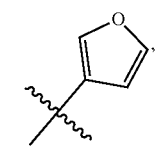
(3)

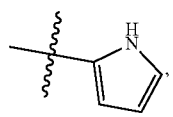
(4)

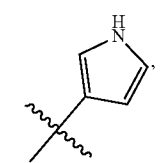
(5)

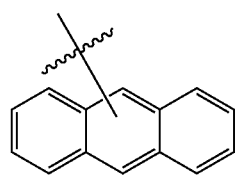
(6)

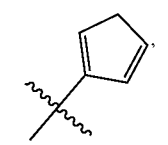
(7)

(8)

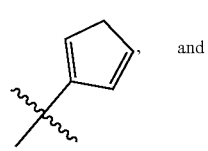
(9) and

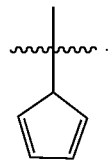
(10)

In a refinement, substituted conjugated dienes having formulae 2 to 10 are substituted with one or more (e.g, 1, 2, 3, 4, 5) of $C_{1-6}$ alkyl, $C_{6-10}$ aryl, $C_{6-10}$ heteroaryl, alylaryl, $-NO_2$, $-NH_2$, $-N(R'R'')$, $-N(R'R''R''')^+L^-$, Cl, F, Br, $-CF_3$, $-CCl_3$, $-CN$, $-SO_3H$, $-PO_3H_2$, $-COOH$, $-CO_2R'$, $-COR'$, $-CHO$, $-OH$, $-OR'$, $-O^-M^+$, $-SO_3^-M^+$, $-PO_3^-M^+$, $-COO^-M^+$, $-CF_2H$, $-CF_2R'$, $-CFH_2$, and $-CFR'R''$ where R', R'' and R''' are $C_{1-10}$ alkyl or $C_{6-18}$ aryl groups.

The dienophile-containing moiety includes a carbon-carbon double bond or a carbon-carbon triple bond. In a variation, the dienophile-containing moiety is described by the following formulae:

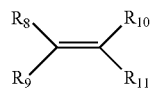
(11)

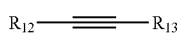
(12)

wherein $R_8$, $R_9$, $R_{10}$, $R_{11}$, $R_{12}$, $R_{13}$ are each independently H, $C_{1-10}$ alkyl, $CO_2R_7$, $COR_7$, or CN, or $R_8$ and $R_{10}$ are merged together to form a 5, 6, or 7 member hydrocarbon ring optionally substituted with a hetero atom (e.g., NR, O, S where R is H or $C_{1-6}$ alkyl) and/or =O; and $R_7$ is H or $C_{1-6}$ alkyl. An example of a dienophile-containing moiety is:

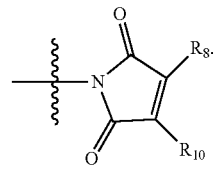
(13)

In a variation, the cross-links are present in an amount from at least 0.1 to 10 weight percent of the total weight of the plurality of polymer backbones. In a refinement, the cross-links are present in an amount from at least 1 to 8 weight percent of the total weight of the plurality of polymer backbones. In some refinement, the cross-links are present in an amount of at least in increasing order of preference 0.05 weight percent, 0.1 weight percent, 0.5 weight percent, 1 weight percent, 3 weight percent, or 5 weight percent of the total weight of the plurality of polymer backbones. In further refinements, the cross-links are present in an amount of at most in increasing order of preference 15 weight percent, 12 weight percent, 10 weight percent, 8 weight percent, 7 weight percent, or 6 weight percent of the total weight of the plurality of polymer backbones.

In a variation, the polymer backbone in the plurality of polymer backbones is composed of a thermoplastic polymer. For example, the thermoplastic polymer includes a component selected from the group consisting of polyolefins, acrylate polymers, polystyrene polymers, polyester polymers, polyurethane polymers, polyamide polymers, and copolymers thereof. In a refinement, the thermoplastic polymer includes a high-density polyethylene.

In another variation, each polymer backbone in the plurality of polymer backbones is formed from one or more monomers selected from the group consisting of ethylene, propylene, methacrylate, methyl methacrylate, ethyl acrylate, ethyl methacrylate, 1-butylene, 2 butylene, vinyl acetate, methacrylate, methyl acrylate, ethyl acrylate, 2-chloroethyl vinyl ether, 2-ethylhexyl acrylate, hydroxyethyl methacrylate, butyl acrylate, butyl methacrylate, trimethylolpropane triacrylate, pentafluorophenyl methacrylate, pentafluorophenyl acrylate, 1,1,1,3,3,3-hexafluoroisopropyl acrylate, bis-(2,2,2-trifluoroethyl) itaconate, bis-(1,1,1,3,3,3-hexafluoroisopropyl), 1H,1H,3H-hexafluorobutyl acrylate, 1H,1H,7H-dodecafluoroheptyl methacrylate, 2,2,2-trifluoroethyl acrylate, 2,2,2-trifluoroethyl methacrylate, aliphatic, fluorinated aliphatic, 1H,1H,2H,2H-heptadecafluorodecyl acrylate, 1H,1H,5H-octafluoropentyl acrylate, 1H,1H,3H-tetrafluoropropyl methacrylate, hexafluoro-isopropyl, 1H,1H,3H-hexafluorobutyl methacrylate, 1H,1H,5H-octafluoropentyl methacrylate, 1-butylene, 2 butylene, vinyl acetate, dimethyl siloxane, methyl vinyl siloxane, and combinations thereof. In a refinement, each polymer backbone in the plurality of polymer backbones is formed from one or more monomers selected from the group consisting of ethylene, propylene, methacrylate, methyl methacrylate, ethyl acrylate, ethyl methacrylate, 1-butylene, 2 butylene, vinyl acetate, and combinations thereof.

In another embodiment, a polymer blend is provided. The polymer blend includes two or more polymers and the polymer composition set forth above with Diels-Alder linking as a compatibilizer. The two or more polymers can be selected from the group consisting of polyolefins, acrylate polymers, polystyrene polymers, polyester polymers, polyurethane polymers, polyamide polymers, and copolymers thereof. In a refinement, the compatibilizer is present in an amount from about 0.1 to 20 weight percent of the total weight of the polymer blend. In a further refinement, the compatibilizer is present in an amount from about 0.1 to 10 weight percent of the total weight of the polymer blend.

In another embodiment, a method for making a polymer composition that operates as a polymer compatibilizer is provided. The method includes a step of providing a plurality of polymer backbones and cross-linking the plurality of polymer backbones by a Diels-Alder reaction between at least one dienophile-containing moiety and at least one diene-containing moiety at a reaction temperature. The reaction temperature is typically greater than 50° C. In a refinement, the Diels-Alder reaction includes a first cyclohexene moiety and a second cyclohexene moiety separated by a predetermined number of carbon atoms or heteroatoms. As set forth above, at least one dienophile-containing moiety and at least one diene-containing moiety can be grafted onto the same polymer backbone. In this variation, the cross-linking can occur between two or more polymer backbones or within a single polymer backbone. In another variation, at least one dienophile-containing moiety is grafted onto a first subset of the plurality of polymer backbones and at least one diene-containing moiety is grafted onto a second subset of the plurality of polymer backbones. In this variation, cross-linking can occur between two or more polymer backbones. In another variation, at least one diene-containing moiety is grafted onto polymer backbones and cross-linking agents that carry two or more dienophile-containing moieties. In this variation, cross-linking can occur between two or more polymer backbones. In still another variation, at least one dienophile-containing moiety is grafted onto polymer backbones and cross-linking agents that carry two or more diene-containing moieties. In this variation, cross-linking can occur between two or more polymer backbones.

In a variation, the diene group-containing moieties and/or the dienophile-containing moieties are grafted on the polymer backbones by a free radical grafting. In a refinement, the diene group-containing moieties and/or the dienophile-containing moieties are grafted during reactive extrusion.

As set forth above, the plurality of polymer backbones can be provided from a plurality of polymer compositions with differing chemical formulations with each polymer composition including a portion of the plurality of polymer backbones.

In a variation, a polymer blend is combined with the compatibilizer. As set forth above, The polymer blend includes two or more polymers and the polymer composition set forth above with Diels-Alder linking as a compatibilizer. The two or more polymers can be selected from the group consisting of polyolefins, acrylate polymers, polystyrene polymers, polyester polymers, polyurethane polymers, polyamide polymers, and copolymers thereof. In a refinement, the compatibilizer is present in an amount from about 0.1 to 10 weight percent of the total weight of the polymer blend.

In a variation, the cyclohexene units from the Diels-Alder cross-linking reaction are present in an amount from at least $1\times10^{-6}$ to about $1\times10^{-3}$ mol/g of the total weight of the polymer blends. In a refinement, the cyclohexene units from the Diels-Alder cross-linking reaction are present in an amount from at least $1\times10^{-5}$ to about $1\times10^{-4}$ mol/g of the total weight of the polymer blends.

With respect to the method, additional details regarding the dienophile-containing moieties, the diene-containing moieties, and the cross-linking agents, are set forth above, The following examples illustrate the various embodiments of the present invention. Those skilled in the art will recognize many variations that are within the spirit of the present invention and scope of the claims.

General Polymer Compatibilizer Design

A general compatibilizer design provides immiscible blends that can be kinetically trapped by the addition of a covalent adaptive network (CAN) which will dissociate under high temperature and stress and would quickly reform once shear and heat are removed. Mechanically trapping the immiscible polymers from phase segregating provides a novel route for compatibilization that is distinctly different than previously reported approaches. This method of freezing the topology is independent of the polymer composition since it doesn't rely on the specific chemistry of the polymers in the blends. To achieve rapid and stable trapping, the dynamic motif must i) utilize dissociative exchange ii) have thermal stability under processing conditions, and iii) have chemical stability towards the functionalities observed in most polymers.

A well-studied dissociative exchange motif that fits the above criteria is the Diels-Alder (DA) adduct, which has been studied extensively due to the wide variety of available diene and dienophiles.[15] By changing the DA constituents, the temperature window of cycloaddition and retro-Diels-Alder (r-DA) can be tuned to match the specific application. Herein, we report progress towards the development of DA-based compatibilizers (FIG. 1). Specifically, DA-functional polymers are prepared and melt blended into several immiscible polymer blends. Upon cooling, the DA adducts will form crosslinks that trap the blend from phase separating.

Results and Discussion
Initial Efforts with Furan and Maleimide DA Adducts

Figure 1A:
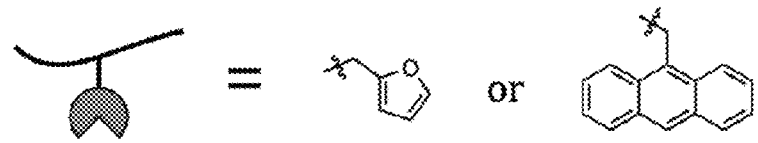
FIGS. 1A, 1B, 1C, and 1D. The design concept for generalized compatibilizer. By mixing a polymer-grafted diene (A) and dienophile (B) in a blend of polymers (C), the topology can be arrested with cooling (D) prior to phase segregation of the mixture. The network can be reprocessed with further heat and mixing.
Figure 1B:
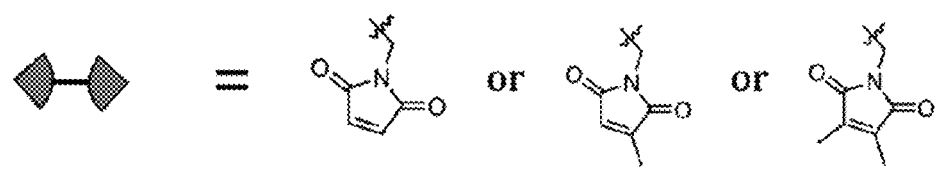
Figure 1C:
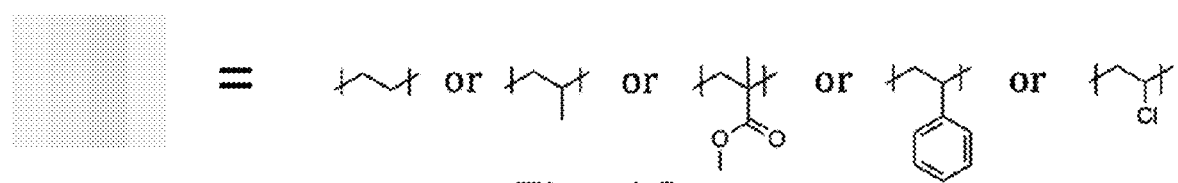
Figure 1D:
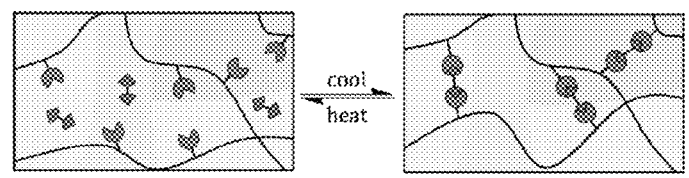
Figure 2:
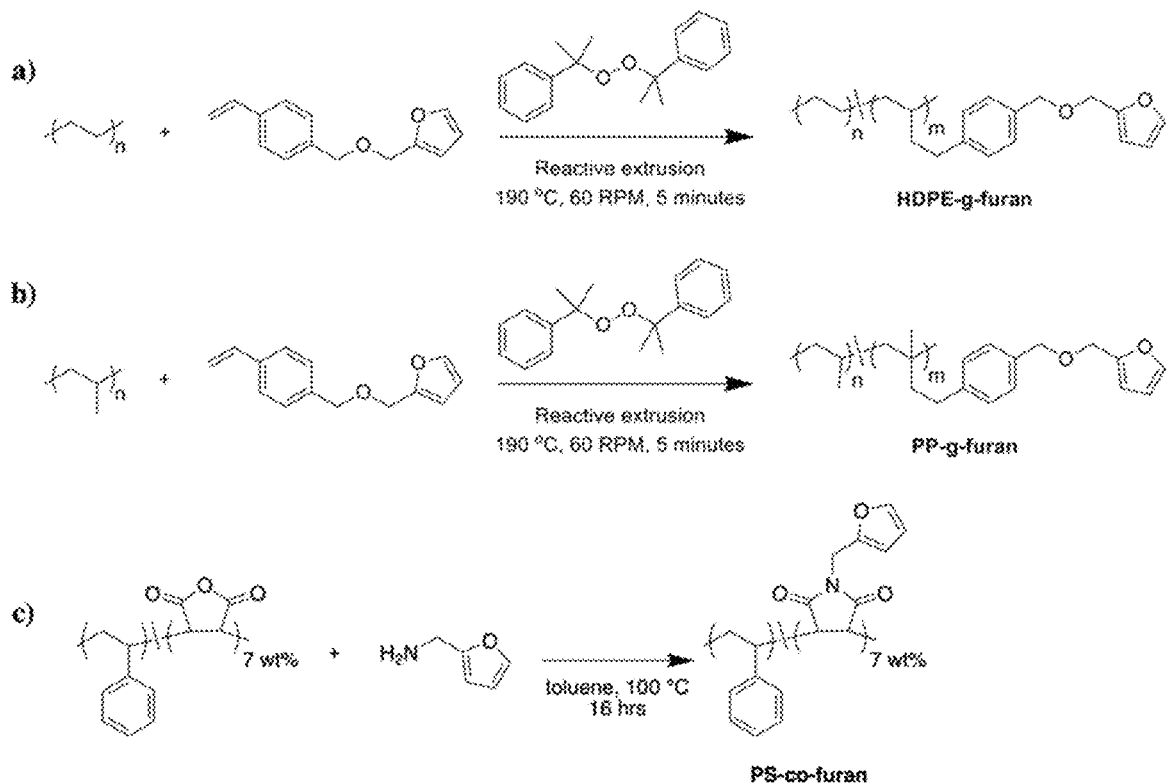
FIG. 2. Scheme 1. Synthesis of furan-functionalized polymers

Furan-maleimide DA adducts are thermally stable, insensitive to common functional groups, and have been well studied in literature for their high efficiency and mild temperature window for DA/r-DA.[16] At approximately 100° C. the r-DA begins to dominate, and below 80° C. the adduct begins to form. This temperature window was initially targeted as it meant that we could anneal the freshly mixed blend at room temperature without further processing. To synthesize the compatibilizer (Scheme 1, FIG. 2), the monomer 2-(((4-vinylbenzyl)oxy)methyl)furan was synthesized and radically grafted to both high-density polyethylene (HDPE, MFI=2.2 g/10 min) and isotactic polypropylene (PP, $M_n$=97,000 g/mol) using dicumyl peroxide (DCP). The radical grafting was achieved using a benchtop twin-screw extruder heated to 190° C. and operating at 60 RPM for five minutes. The extruder has a recirculating valve that allows for extended residence time to mimic large-scale production extruders. The material was ejected and residual monomer was removed through precipitation from heated xylene into methanol. Through $^1$H-NMR it was found that the HDPE-g-furan had an average ratio of 1:238 furan to ethylene repeat units while the PP-g-furan had an average of 1:243 furan to propylene repeat units. Higher degrees of functionality were not achievable under this process due to observed side-reactions. Other monomers such as 2-(nitrovinyl)furan, furan-2-ylmethyl acrylate, and furan-2-ylmethyl methacrylate were attempted, however the grafting yield to HDPE was low while no grafting was achieved with PP. Separately, polystyrene-co-furan was prepared from the imidation of poly(styrene-co-maleic anhydride) (Scheme 1, FIG. 2C). These three compatibilizer backbones provide different levels of miscibility with the bulk polymer blend. The maleimides used were BMI-358 and BMI-1500, which are commercially available bifunctional maleimides of 4,4'-methylenedianiline and a low molecular weight fatty imide-extended oligomer. The number following BMI represents the molecular weight of the bismaleimide.

After preparing the three types of furan-grafted polymers, they were screened against several commodity polymer blends using maleimide as the dienophile. Different levels of compatibilized material were melt blended using a twin-screw extruder heated to 190° C. operating at 60 RPM. After extrusion, the samples were flushed from the extruder and immediately annealed at 70° C. for 2 hours under vacuum to promote Diels-Alder formation. After annealing, samples were characterized by SEM, DSC, DMTA, and FTIR. Scanning electron microscopy (SEM) micrographs were taken of the fractured interface to observe compatibility. If compatibilized, the phases should have stronger adhesion and resist breakage. This can be tested by looking at the fractured surface for stretched polymer strands as the compatibilized interface resists separation. It has also been observed that compatibilization promotes smaller droplet size for the minor phase, however, it is unknown if our kinetic trapping design will have similar behavior to the literature. If there is no compatibilization, the interface should have clean separation as the phases are cleanly de-bonded.

Figure 3:
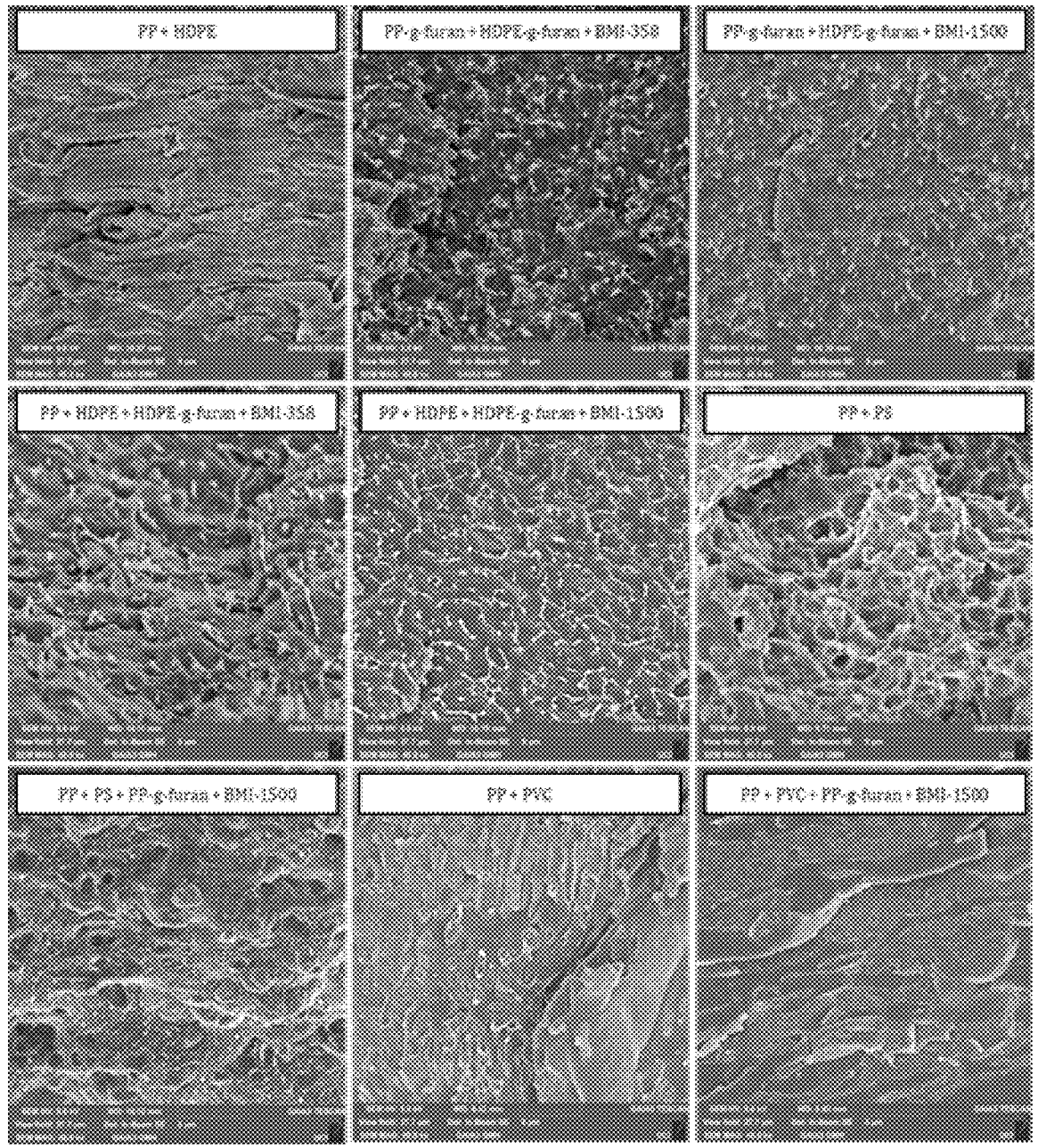
FIG. 3. Representative SEM micrographs of immiscible polymer blends. (top left) 50% iPP+50% HDPE (top center) 50% PP-g-furan+50% HDPE-g-furan+1 equiv. BMI-358 (top right) 50% PP-g-furan+50% HDPE-g-furan+1 equiv.

The SEM micrographs in FIG. 3, show low levels of compatibilization for several blends. The iPP+HDPE control (top left) showed large-scale tearing and relatively large dispersions. Upon the addition of our compatibilizer to PP+HDPE blends, smaller features begin to emerge, and hair-like strands can be observed as the blend resists the shearing force. In the case of the PP+PS control and the PP+PS+compatibilizer, the change is less dramatic. Pitting can be observed where one of the phases cleanly do-bonds from the other and leaves craters, indicating challenges in compatibilizing PP and PS. For PP+PVC control and PP+PVC+compatibilizer, the change is more dramatic. The PP+PVC control has clear dark lines surrounding the domains which indicates clean de-bonding of the phases, however upon the addition of a compatibilizer the separation lines disappear, and the blend becomes more homogenous. The difference in compatibilization in the blends is likely to arise from the dispersion ability of PP-g-furan and BMI-1500 in the molten state. Both DA polymers must have similar miscibility to find each other and form the adducts upon cooling. If there is a large difference in miscibility, then the DA polymers will likely not find each other, and phase separation will continue to occur.

Other methods of characterization such as DSC, DMTA, and FT-IR provided no evidence for compatibilization. The Flory-Fox equation predicts that in miscible polymer blend a new $T_g$ will form between the two $T_g$s of the main constituents.[17] We were hoping to observe the $T_g$ using DSC or DMTA measurements, however no $T_g$ was observed for any of the compatibilized blends (data not shown). Our rationale is that the DA adduct-bearing polymers are not totally miscible with either of the main components and may instead reside at the interface. As such, the kinetic trapping will only occur at the thin interface between phases. Such behavior would be difficult to detect through DSC and DMTA measurements as they don't have the sensitivity to detect such small glass transitions. In FT-IR measurements, the furan and maleimide signals could not be observed despite their observation in $^1$H-NMR. We attribute this to the low abundance of furan and maleimide due to the low grafting efficiency from the reactive extrusion process. Separately, an additional screen of polymer blend compatibilization was attempted using the polystyrene-based furan (Scheme 1, FIG. 2C). We hoped that a modification to the backbone would promote better mixing with the main blend components, however little compatibilization was observed (data not shown). The positive results from SEM imaging in FIG. 3 indicate there is some compatibilization effect we are observing, however without further characterization data it is problematic to draw conclusion from our limited observations.

Current Efforts Towards Anthracene-Malemide DA Adducts

The results from the furan-maleimide DA adducts suggest that we need faster cycloaddition between the diene and dienophile as well as an increase in the thermal window for the DA/r-DA. With these new targets, the trapping process can occur more quickly post-extrusion which will give the immiscible phases less chance to phase separate. After searching for compatible DA adducts, we settled on anthracene as the diene and alkyl-substituted maleimide as the dienophile. Anthracene-maleimide DA adducts are extremely stable and have been well studied in literature, however the DA reaction only occurs above 180° C. and the r-DA at temperatures>250° C. While this temperature window is too high for our applications, the window can be tuned by the addition of alkyl substituents to the maleimide (Scheme 2, FIG. 4B). The alkyl substituents introduce steric hinderance to the adduct and lower the DA/retro-DA window down into our extrusion temperature zone.

To determine the DA/r-DA temperatures for methyl-substituted maleimides, a model compound screen of anthracene and maleimide were performed. For anthracene and un-substituted maleimide (FIG. 5A), the adduct did not form until temperatures reached 180° C., however the reaction was practically irreversible as the adduct decomposed at 250° C. before any retro-DA was observed. Dimethyl maleimide (FIG. 5C) was on the opposite end of the reactivity spectrum in that no DA adduct was observed at when held at 25° C., 160° C., and 200° C. In the apparent Goldilocks zone, the monomethyl maleimide was found to start forming the DA adduct above 160° C. and the retro-DA was observed at temperatures above 200° C. (Scheme 6). This thermal window is better suited for the processing conditions of the extruder since most plastics are processed in the temperature range of 180-230° C.

To further investigate the thermal window of DA/retro-DA equilibrium for the monomethylmalide adduct, thermal sweeps using DSC were utilized to measure the endothermic and exothermic transitions. The adduct formation is an exothermic process while the retro-DA is an endothermic process. Butyric anthracene and monomethylmale-imide (FIG. 6A) were added in a 1:1 ratio in 1,2,4-trichlorobenzene and heated to 180° C. for 1 hour. The solution was then precipitated into methanol and filtered and dried to yield the isolated DA adduct. On the first heating cycle in DSC (FIG. 6B), an exothermic peak can be observed at 91° C. indicating some further DA adduct formation is occurring. Immediately following, two endothermic peaks at 140° C. and 161° C. indicate a retro-DA process is occurring. The first peak is likely the cis isomer and the second peak is likely the trans isomer in reference to the monomethyl peak's relationship to the alkyl substituent on anthracene. The two isomers were likely caused by the rapid cooling of the initial DA adduct formation. The heat-cool was repeated several times and the more gradual cooling process seems to promote the formation of the more thermodynamically favored trans product. The DA chemistry has good reversibility and should translate well to the compatibilizer system where it may experience several reprocessing cycles.

EXPERIMENTAL

Unless otherwise noted, reactions were carried out with dry solvents using a magnetic stir bar. Commercial reagents were used as received with no further purification unless otherwise noted. $^1$H NMR spectra were recorded at either 500 MHz on a Bruker DRX500 spectrometer or at 600 MHz on a Bruker AVANCE600 spectrometer. NMR spectra peaks are reported as δ values in ppm relative to TMS or residual solvent: $CDCl_3$ ($^1$H=7.26 ppm), $C_7D_8$ ($^1$H=7.10-7.20, 2.34 ppm). Differential Scanning Calorimetry (DSC) thermograms were evaluated using a TA Instruments DSC2500. Thermogravimetric Analysis (TGA) thermograms were evaluated using a TA Instruments Q500. Dynamic Mechanical Thermal Analysis (DMTA) analysis was evaluated using a TA Instruments Q800. Gas chromatography-mass spectrometry experiments (GC-MS) were taken using a Thermo Scientific ISQ GC Ultra. Scanning electron microscopy (SEM) micrographs were taken on a Tescan GAIA-3 XMG FIB by first sputter coating samples with carbon. SEM acceleration voltage was set to 5.0 kV and both backscattering and secondary electron detectors were used.

Scheme 3. Synthesis of styryl furan

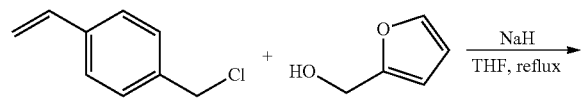

-continued

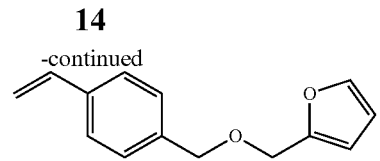

To prepare the styryl furan monomer, furfuryl alcohol (2.5 equiv., 65.5 mmol, 6.43 g) was dissolved in 15 mL anhydrous THF and added to a flame dried, nitrogen flushed, 3-necked round bottom fitted with a condenser and stir bar. The solution was cooled to 0° C. Sodium hydride (60% in mineral oil, 1.1 equiv., 28.8 mmol, 1.15 g) was dissolved in 20 mL anhydrous THF to form a suspension. The suspension slowly to the round bottom, turning the solution from light yellow to pale orange. After bubbling ceased, 1-(chloromethyl)-4-vinylbenzene (1 equiv., 26.2 mmol, 4.00 g) dissolved in 15 mL anhydrous THF was added dropwise. The solution was slowly brought to reflux where the color changed to a transparent brown. The reaction progress was monitored by TLC in 100% hexanes. After completion, the sodium hydride was quenched with 25 mL saturated ammonium hydride and the mixture was transferred to a 250 mL separatory funnel. The crude product was extracted with dichloromethane (50 mL×3), dried over magnesium sulfate, and purified by column chromatography (1:10 ethyl acetate: hexane). The diluted product was reduced in vacuo to yield 4.12 g (73.4%). $^1$H NMR (500 MHz, $CDCl_3$) δ 7.43 (s, 1H), 7.40 (d, J=7.9 Hz, 2H), 7.31 (d, J=7.8 Hz, 2H), 6.72 (dd, J=17.2, 10.5 Hz, 1H), 6.35 (s, 1H), 6.33 (s, 1H), 5.75 (d, J=17.7 Hz, 1H), 5.24 (d, J=10.9 Hz, 1H), 4.54 (s, 2H), 4.48 (s, 2H). Low resolution MS (ESI+): m/z calcd. for C14H14NaO2 [M+Na]: 237.1; found 237.6.

Scheme 4. Representative synthesis of acetylated anthracene

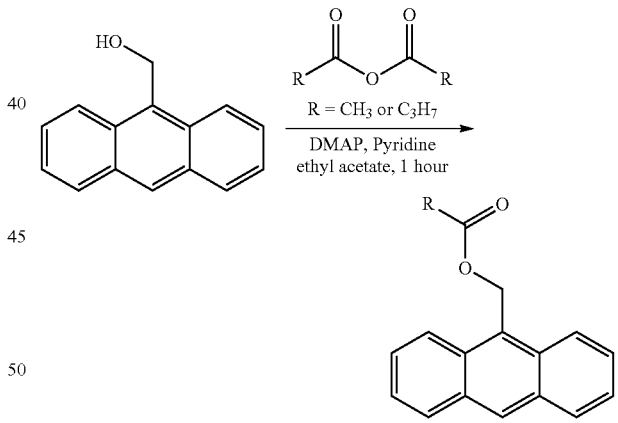

Substituted anthracenes were prepared according to literature procedure.[1] Into a nitrogen-flushed round bottom flask, 9-methoxyanthracene (1 equiv., 14.41 mmol, 3.000 g) was dissolved in anhydrous dichloromethane (50 mL) and cooled to 0° C. Once cooled, pyridine (5 equiv., 72.03 mmol, 5.80 mL), acetic anhydride (3 equiv., 4.412 g, 4.09 mL), and dimethyl aminopyridine (0.1 equiv., 176 mg, 1.44 mmol) were added and stirred for 1 hour. The solvent was then evaporated in vacuo and the crude mixture was dissolved in 300 mL ethyl acetate. The organic layer was washed with saturated copper sulfate (3×100 mL) to remove residual amines. The organic layer was then washed with brine (2×100 mL) and dried with magnesium sulfate. The solvent was removed and the product was purified with flash chromatography (80:20 hexanes:ethyl acetate) to afford acetylated anthracene (3.4032 g, 94.4% yield). R=CH$_3$: $^1$H NMR (500 MHz, CDCl$_3$) δ 8.52 (s, 1H), 8.34 (d, J=8.9 Hz, 2H), 8.04 (d, J=8.4 Hz, 2H), 7.54 (dt, J=14.9, 6.9 Hz, 4H), 6.16 (s, 2H), 2.09 (s, 3H). $^{13}$C NMR (125 MHz, CDCl$_3$) δ 171.39, 131.45, 131.10, 129.26, 129.18, 126.72, 126.25, 125.17, 123.97, 58.88, 21.07. R=C$_3$H$_7$: $^1$H NMR (500 MHz, CDCl$_3$) δ 8.55 (s, 1H), 8.40 (d, J=8.9 Hz, 2H), 8.08 (d, J=8.4 Hz, 2H), 7.64 (t, J=7.4 Hz, 2H), 7.56 (t, J=7.5 Hz, 2H), 6.22 (s, 2H), 2.39 (t, J=7.4 Hz, 2H), 1.77-1.67 (m, 2H), 0.98 (t, J=7.4 Hz, 3H). $^{13}$C NMR (125 MHz, CDCl$_3$) δ 174.01, 131.45, 131.10, 129.16, 126.66, 126.46, 125.15, 124.01, 58.69, 36.25, 18.55, 13.70.

Scheme 5. Representative synthesis of maleimide synthesis

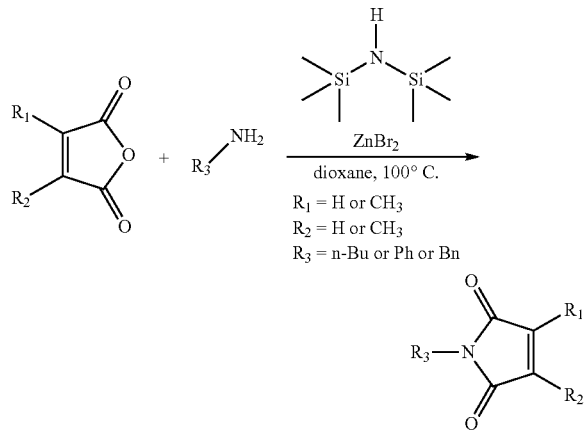

Substituted maleimides were prepared according to similar literature procedure.[2] Into a dried round bottom flask, citraconic anhydride (1.05 equiv, 21.53 mmol, 1.94 mL) was dissolved in anhydrous dioxanes (50 mL). n-Butyl amine (1 equiv., 20.51 mL, 2.00 mL) was added dropwise and the mixture was brought to 100° C. and heated for 1 hour. The reaction was brought to room temperature and ZnBr$_2$ (1.05 equiv., 21.53 mmol, 4.849 g) and hexamethyl disilazane (1.5 equiv., 30.76 mmol, 6.4 mL) were added. The suspension was then heated to 100° C. for 1 hour and progress monitored by TLC. The solvent was removed in vacuo and the slurry resuspended in ether. The suspension was filtered through a cellulose filter to remove ZnBr$_2$. The ether was removed in vacuo and the crude product was purified through flash chromatography (80:20 hexanes:ethyl acetate) to yield N-butyl monomethylmaleimide (1.208 g, 43% yield). R$_1$–H, R$_2$=H, R$_3$=Ph: Yield=46%, $^1$H NMR (500 MHz, CDCl$_3$) δ7.53-7.29 (m, 5H), 6.86 (s, 2H). $^{13}$C NMR (125 MHz, CDCl$_3$) δ 169.6, 134.3, 131.3, 129.2, 128.0, 126.1 R$_1$=CH$_3$, R$_2$=H, R$_3$=Bn: Yield=43%, $^1$H NMR (500 MHz, CDCl$_3$) δ 7.43-7.16 (m, 5H), 6.32 (s, 1H), 4.65 (s, 2H), 2.08 (s, 3H). $^{13}$C NMR (125 MHz, CDCl$_3$) δ 171.6, 170.5, 145.8, 136.5, 128.7, 128.4, 127.8, 127.5, 41.5, 11.0 R$_1$=CH$_3$, R$_2$=CH$_3$, R$_3$=Bn: Yield=59%, $^1$H NMR (500 MHz, CDCl$_3$) δ 7.40-7.19 (m, 5H), 4.64 (s, 2H), 1.95 (s, 6H). $^{13}$C NMR (125 MHz, CDCl$_3$) δ 171.9, 137.3, 136.8, 128.6, 128.4, 127.7, 41.5, 8.8.

Isotactic Polypropylene Grafting Procedure

Isotactic polypropylene pellets (iPP, M$_n$=97,000, 3 mm diameter) were cryogenically milled using a Fritsch rotary mill through a 2.0 mm sieve cassette to produce a fine powder. The powder was dried at 80° C. for 4 hours prior to grafting. Into a mixing tube, iPP powder (8.00 grams), styryl furan (8 wt %, 640 mg), and dicumyl peroxide (0.5 wt %, 40 mg) were added and vigorously mixed for 10 minutes. The mixture was split into two portions and were fed into a twin-screw extruder heated to 180° C. with nitrogen flushing. The speed was set to 60 RPM and the molten polymer was cycled for 10 minutes before expelling and pelletizing. The PP-g-furan was dissolved in refluxing xylenes and precipitated into vigorously mechanically stirred methanol to remove residual un-grafted monomer. The powder was dried and used for compatibilization experiments without further purification.

High Density Polyethylene Grafting Procedure

High density polyethylene pellets (HDPE, MFI=2.2 g/10 minutes (190° C./2.16 kg), 3 mm diameter) were cryogenically milled using a Fritsch rotary mill through a 0.5 mm sieve cassette to produce a fine powder. The powder was dried at 80° C. for 4 hours prior to grafting. Into a mixing tube, HDPE powder (8.00 grams), styryl furan (8 wt %, 640 mg), and dicumyl peroxide (0.5 wt %, 40 mg) were added and vigorously mixed for 10 minutes. The mixture was split into two portions and were fed into a twin-screw extruder heated to 190° C. with nitrogen flushing. The speed was set to 60 RPM and the molten polymer was cycled for 10 minutes before expelling and pelletizing. The HDPE-g-furan was dissolved in refluxing xylenes and precipitated into vigorously mechanically stirred methanol to remove residual un-grafted monomer. The powder was dried and used for compatibilization experiments without further purification.

Preparation of Poly(Styrene-Co-Furan)

Poly(styrene-co-maleic anhydride) (7 wt % maleic anhydride) pellets of approximately 3 mm diameter were dried in a PTFE dish in a vacuum oven at 175° C. for one hour. After drying, 10.00 grams of pellets and a stir bar were added to a nitrogen-flushed round bottom. Approximately 100 mL of dry toluene was added to the flask and the mixture was heated to 90° C. After pellets had dissolved, furfuryl amine (3 equiv., 1.89 mL) was added and the flask was wrapped in aluminum foil. The mixture was stirred for 16 hours followed by precipitation into cold methanol. The precipitate was concentrated through centrifugation, filtered, and dried under vacuum at 175° C. Conversion was determined to be 98% via $^1$H-NMR.

Representative Compatibilized Polymer Blending Procedure

Into a mixing tube 5 mg BHT inhibitor and the necessary amounts of ground polymer pellets were added. The pellets were vigorously shaken for 5 minutes to sufficiently coat the surface with BHT to prevent unwanted oxidation. The mixture was extruded at 190° C. at 60 RPM with nitrogen flushing for 5 minuets before expelling. Extruded strands were then annealed for 2 hours at 70° C. For SEM measurements, the strands were submerged into liquid nitrogen for 5 minutes and then snapped by hand. The fractured surface was then sputter coated with carbon filament and characterized using SEM.

DSC Measurements on the DA/r-DA for Anthracene-Monomethylmaleimide Adducts

The anthracene-monomethylmaleimide DA adduct was first prepared by adding acetylated anthracene (anthracene-9-ylmethyl butyrate, 1.00 equiv., 83.4 mg) and monomethyl maleimide (1-benzyl-3-methyl-1H-pyrrole-2,5-dione, 1.00 equiv., 60.3 mg) in 2 mL tetraglyme and heating to 200° C. for 20 minutes. The solution was cooled to room temperature and precipitated into cold methanol, filtered, and dried to yield a white powder. Approximately 10 mg of powder was placed in a hermetically sealed DSC pan and ramped at 20° C./min and cooled at 10° C./min between 50° C. and 250° C. in a heat/cool/heat/cool/heat cycle (FIG. 6).

$^1$H-NMR Studies of r-DA Temperatures Using Trapping Reagent

At high temperatures, observation of the r-DA reaction temperature for anthracene-monomethylmaleimide adducts become experimentally challenging due to rapid adduct formation during cooling back to room temperature for standard chemical characterization. As such, we proposed a trapping method to find the initial r-DA temperature by adding a trapping agent, maleic anhydride, that would preferentially react with the anthracene after its dissociation from the maleimide. By monitoring for the appearance of maleimide, we can determine the initial r-DA temperature.

Scheme 6. Scheme for the dissociation of the anthracene-monomethylmaleimide adduct and trapping of anthracene with maleic anhydride.

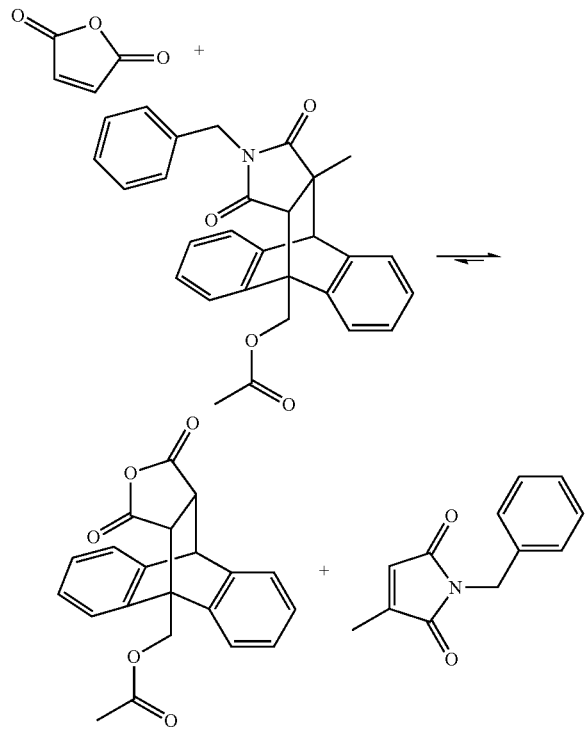

First, an anthracene-monomethylmaleimide DA adduct was prepared by adding acetylated anthracene (anthracene-9-ylmethyl acetate, 1.00 equiv., 75.0 mg) and monomethyl maleimide (1-benzyl-3-methyl-1H-pyrrole-2,5-dione, 1.00 equiv., 60.3 mg) in 2 mL of tetraglyme and heating to 200° C. for 20 minutes. The solution was cooled to room temperature, precipitated into cold methanol, filtered, and dried under vacuum to yield a white powder. An oil bath was preheated to 135° C., and anthracene-monomethylmaleimide DA adduct (1 equiv., 43.7 mg, 0.1 mmol) was added to a vial containing 1.00 mL of 1,2,4-trichlorobenzene and a magnetic stir bar. Maleic anhydride (10 equiv., 98.0 mg, 1.0 mmol) was added to the vial and dissolved. The vial was sealed and placed in the oil bath for 10 minutes. After 10 minutes, an aliquot was taken and diluted in CDCl$_3$ for $^1$H-NMR analysis. This procedure was repeated at 190° C. and 210° C.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

REFERENCES (1) Utracki, L. A. *Polymer Blends Handbook*, Kluwer Academic Pub, 2002.
(2) Barlow, J. W.; Paul, D. R. Polymer Blends and Alloys—a Review of Selected Considerations. *Polym. Eng. Sci.* 1981, 21 (15), 985-996. https://doi.org/10.1002/pen.760211502.
(3) Bates, F. S. Polymer-Polymer Phase Behavior. *Science* 1991, 251 (4996), 898-905. https://doi.org/10.1126/science.251.4996.898.
(4) Luciani, A.; Jarrin, J. Morphology Development in Immiscible Polymer Blends. *Polym. Eng. Sci.* 1996, 36 (12), 1619-1626. https://doi.org/10.1002/pen.10558.
(5) Porter, R. S.; Johnson, J. F. The Entanglement Concept in Polymer Systems. *Chem. Rev.* 1966, 66 (1), 1-27. https://doi.org/10.1021/cr60239a001.
(6) Kinloch, A. J. *Fracture Behaviour of Polymers*; Springer Science & Business Media, 2013.
(7) Eagan, J. M.; Xu, J.; Girolamo, R. D.; Thurber, C. M.; Macosko, C. W.; LaPointe, A. M.; Bates, F. S.; Coates, G. W. Combining Polyethylene and Polypropylene: Enhanced Performance with PE/PP Multiblock Polymers. *Science* 2017, 355 (6327), 814-816. https//doi.org/10.1126/science.aah5744.
(8) Xu, Y.; Thurber, C. M.; Macosko, C. W.; Lodge, T. P.; Hillmyer, M. A. Poly(Methyl Methacrylate)-Block-Polyethylene-Block-Poly(Methyl Methacrylate) Triblock Copolymers as Compatibilizers for Polyethylene/Poly (Methyl Methacrylate) Blends. *Ind. Eng. Chem. Res.* 2014, 53 (12), 4718-4725. https://doi.org/10.1021/ie4043196.
(9) Rigby, D.; Lin, J. L.; Roe, R. J. Compatibilizing Effect of Random or Block Copolymer Added to Binary Mixture of Homopolymers. *Macromolecules* 1985, 18 (11), 2269-2273. https://doi.org/10.1021/ma00153a036.
(10) Blom, H. P.; Teh, J. W.; Rudin, A. I-PP/HDPE Blends. III. Characterization and Compatibilization at Lower i-PP Contents. *J. Appl. Polym. Sci.* 1996, 61 (6), 959-968. https://doi.org/10.1002/(SICI)1097-4628(19960808)61:6<959::AID-APP10>3.0.CO;2-Q.
(11) Sun, Y.-J.; Hu, G.-H.; Lambla, M.; Kotlar, H. K. In Situ Compatibilization of Polypropylene and Poly(Butylene Terephthalate) Polymer Blends by One-Step Reactive Extrusion. *Polymer* 1996, 37(18), 4119-4127. https://doi.org/10.1016/0032-3861(96)00229-7.
(12) Wei, B.; Lin, Q.; Zheng, X.; Gu, X.; Zhao, L.; Li, J.; Li, Y. Reactive Splicing Compatibilization of Immiscible Polymer Blends: Compatibilizer Synthesis in the Melt State and Compatibilizer Architecture Effects. *Polymer* 2019, 185, 121952. https//doi.org/10.1016/j.polymer.2019.121952.
(13) Jannasch, P.; Wesslén, B. Poly(Styrene-Graft-Ethylene Oxide) as a Compatibilizer in Polystyrene/Polyamide Blends. *J. Appl. Polym. Sci.* 1995, 58 (4), 753-770. https://doi.org/10.1002/app.1995.070580408.

(14) Xu, Y.; Thurber, C. M.; Lodge, T. P.; Hillmyer, M. A. Synthesis and Remarkable Efficacy of Model Polyethylene-Graft-Poly(Methyl Methacrylate) Copolymers as Compatibilizers in Polyethylene/Poly(Methyl Methacrylate) Blends. *Macromolecules* 2012, 45 (24), 9604-9610. https://doi.org/10.1021/ma302187b.

(15) Brieger, G.; Bennett, J. N. The Intramolecular Diels-Alder Reaction. *Chem. Rev.* 1980, 80 (1), 63-97. https://doi.org/10.1021/cr60323a004.

(16) Gandini, A. The Furan/Maleimide Diels-Alder Reaction: A Versatile Click-Unclick Tool in Macromolecular Synthesis. *Prog. Polym. Sci.* 2013, 38 (1), 1-29. https://doi.org/10.1016/j.progpolymsci.2012.04.002.

(17) Aubin, M.; Prud'homme, R. E. Analysis of the Glass Transition Temperature of Miscible Polymer Blends. *Macromolecules* 1988, 21 (10), 2945-2949. https://doi.org/10.1021/ma00188a010.

(18) Geyer, R.; Jambeck, J. R.; Law, K. L. Production, Use, and Fate of All Plastics Ever Made. *Sci. Adv.* 2017, 3 (7), e1700782. https://doi.org/10.1126/sciadv.1700782.

(19) A.; Joullie, M.; Spanevello, R.; Suarez, A. Microwave-Assisted Regioselective Cycloaddition Reactions between 9-Substituted Anthracenes and Levoglucosenone. *Org. Lett.* 2006, 8, 24, 5561-5564. https://doi.org/10.1021/ol062254g.

(20) Reddy, P.; Kondo, S.; Toru, T.; Ueno, Y.; Lewis Acid and Hexamethyldisilazane-Promoted Efficient Synthesis of N-Alkyl- and N-Arylimide Derivatives. *J. Org. Chem.* 1997. 62(8), 2652-2654. https://doi.org/10.1021/jo962202c.

What is claimed is:

1. A polymer blend comprising two or more immiscible polymers and a compatibilizer comprising a plurality of polymer backbones cross-linked by cross-links that are Diels-Alder reaction products of at least one dienophile-containing moiety and at least one diene-containing moiety, wherein the compatibilizer is melt blended into the two or more immiscible polymers.

2. The polymer blend of claim 1, wherein the two or more immiscible polymers are selected from the group consisting of polyolefins, acrylic polymers, polystyrene polymers, polyester polymers, polyurethane polymers, polyamide polymers, and copolymers thereof.

3. The polymer blend of claim 1, wherein the compatibilizer is present in an amount from about 0.1 to 20 weight percent of the total weight of the polymer blend.

4. The polymer blend of claim 1, wherein the plurality of polymer backbones cross-linked by cross-links include a first cyclohexene moiety and a second cyclohexene moiety separated by a predetermined number of carbon atoms or heteroatoms.

5. The polymer blend of claim 1, wherein the at least one dienophile-containing moiety and the at least one diene-containing moiety are grafted onto the same polymer backbone such that cross-linking occurs between two or more polymer backbones or within a single polymer backbone.

6. The polymer blend of claim 1, wherein the at least one dienophile-containing moiety is grafted onto a first subset of the plurality of polymer backbones and the at least one diene-containing moiety is grafted onto a second subset of the plurality of polymer backbones such that cross-linking occurs between two or more polymer backbones.

7. The polymer blend of claim 1, wherein the at least one diene-containing moiety is grafted onto polymer backbones and cross-linking agents that carry two or more dienophile-containing moieties such that cross-linking occurs between two or more polymer backbones.

8. The polymer blend of claim 1, wherein the at least one dienophile-containing moiety is grafted onto polymer backbones and cross-linking agents that carry two or more diene-containing moieties such that cross-linking occurs between two or more polymer backbones.

9. The polymer blend of claim 1, wherein the plurality of polymer backbones are provided from a plurality of polymer compositions with differing chemical formulations, each polymer composition with differing chemical formulations including a portion of the plurality of polymer backbones.

10. The polymer blend of claim 1, wherein the at least one diene-containing moiety includes a conjugated diene having the following formula:

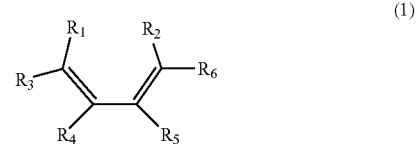

(1)

wherein $R_1$, $R_2$ are each independently H, $C_{1-10}$ alkyl, $CO_2R_7$, $COR_7$, or CN, or $R_1$ and $R_2$ are merged together to form a 5, 6, or 7 member hydrocarbon ring optionally substituted with a hetero atom;

$R_3$, $R_4$, $R_5$, $R_6$ are each independently H, $C_{1-10}$ alkyl, $CO_2R_7$, $COR_7$, or CN; and $R_7$ is H or $C_{1-6}$ alkyl; and at least one of $R_1$, $R_2$, $R_3$, $R_4$, $R_5$, $R_6$ is attached to a polymer backbone or a cross-linking agent.

11. The polymer blend of claim 1, the at least one diene-containing moiety includes a diene group selected from the group consisting of substituted and unsubstituted conjugated dienes having formulae 2 to 10:

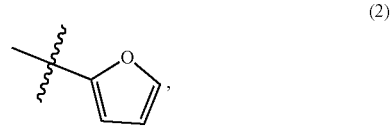

(2)

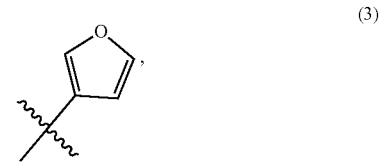

(3)

(4)

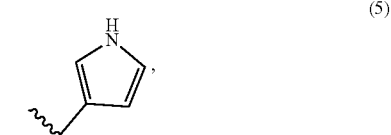

(5)

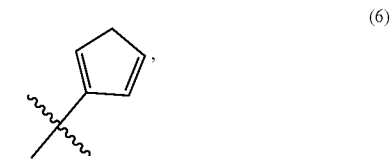

(6)

-continued (7)

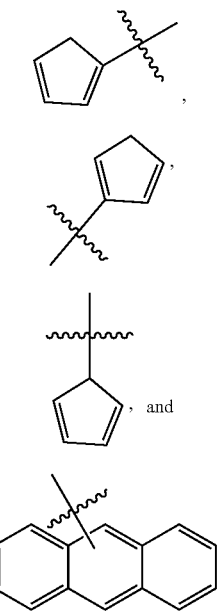

(8)

(9)

(10)

and wherein substituted conjugated dienes having formulae 2 to 10 are substituted with one or more of $C_{1-6}$ alkyl, $C_{6-10}$ aryl, $C_{6-10}$ heteroaryl, alylaryl, —$NO_2$, —$NH_2$, —N(R'R''), —N(R'R''R''')$^+$L$^-$, Cl, F, Br, —$CF_3$, —$CCl_3$, —CN, —$SO_3H$, —$PO_3H_2$, —COOH, —$CO_2$R', —COR', —CHO, —OH, —OR', —O$^-$M$^+$, —$SO_3^-$M$^+$, —$PO_3^-$M$^+$, —COO$^-$M$^+$, —$CF_2$H, —$CF_2$R', —$CFH_2$, and —CFR'R'' where R', R'' and R''' are $C_{1-10}$ alkyl or $C_{6-18}$ aryl groups.

12. The polymer blend of claim 1, wherein the at least one dienophile-containing moiety is described by the following formulae:

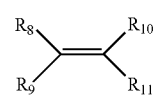
(11)

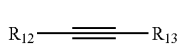
(12)

wherein $R_8$, $R_9$, $R_{10}$, $R_{11}$ are each independently H, $C_{1-10}$ alkyl, $CO_2R_7$, $COR_7$, or CN, or $R_8$ and $R_{10}$ in formula 2 are merged together to form a 5, 6, or 7 member hydrocarbon ring optionally substituted with a hetero atom and/or =O; and $R_7$ is H or $C_{1-6}$ alkyl.

13. The polymer blend of claim 12, wherein the at least one dienophile-containing moiety is described by the following formula:

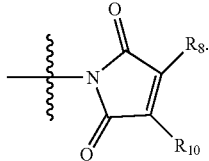
(13)

14. The polymer blend of claim 1, wherein each polymer backbone in the plurality of polymer backbones is composed of a thermoplastic polymer.

15. The polymer blend of claim 14, wherein the thermoplastic polymer includes a component selected from the group consisting of polyolefins, acrylate polymers, polystyrene polymers, polyester polymers, polyurethane polymers, polyamide polymers, and copolymers thereof.

16. The polymer blend of claim 14, wherein the thermoplastic polymer includes a high-density polyethylene.

17. The polymer blend of claim 1, wherein each polymer backbone in the plurality of polymer backbones is formed from one or more monomers selected from the group consisting of ethylene, propylene, methacrylate, methyl methacrylate, ethyl acrylate, ethyl methacrylate, 2-chloroethyl vinyl ether, 2-ethylhexyl acrylate, hydroxyethyl methacrylate, butyl acrylate, butyl methacrylate, trimethylolpropane triacrylate, pentafluorophenyl methacrylate, pentafluorophenyl acrylate, 1,1,1,3,3,3-hexafluoroisopropyl acrylate, bis-(2,2,2-trifluoroethyl) itaconate, bis-(1,1,1,3,3,3-hexafluoroisopropyl), 1H,1H,3H-hexafluorobutyl acrylate, 1H,1H,7H-dodecafluoroheptyl methacrylate, 2,2,2-trifluoroethyl acrylate, 2,2,2-trifluoroethyl methacrylate, aliphatic, fluorinated aliphatic, 1H,1H,2H,2H-heptadecafluorodecyl acrylate, 1H,1H,5H-octafluoropentyl acrylate, 1H,1H,3H-tetrafluoropropyl methacrylate, hexafluoro-isopropyl, 1H,1H,3H-hexafluorobutyl methacrylate, 1H,1H,5H-octafluoropentyl methacrylate, 1-butylene, 2 butylene, vinyl acetate, dimethyl siloxane, methyl vinyl siloxane, and combinations thereof.

18. The polymer blend of claim 1, wherein each polymer backbone in the plurality of polymer backbones is formed from one or more monomers selected from the group consisting of ethylene, propylene, methacrylate, methyl methacrylate, ethyl acrylate, ethyl methacrylate, 2-chloroethyl vinyl ether, 2-ethylhexyl acrylate, hydroxyethyl methacrylate, butyl acrylate, butyl methacrylate, trimethylolpropane triacrylate, and combinations thereof.

* * * * *